US009971519B2

(12) United States Patent
Romem et al.

(10) Patent No.: US 9,971,519 B2
(45) Date of Patent: May 15, 2018

(54) SYSTEM AND METHOD FOR EFFICIENT ACCESS FOR REMOTE STORAGE DEVICES

(71) Applicant: Excelero Storage Ltd., Tel Aviv (IL)

(72) Inventors: Yaniv Romem, Jerusalem (IL); Omri Mann, Jerusalem (IL); Ofer Oshri, Kfar Saba (IL)

(73) Assignee: Excelero Storage Ltd., Tel Aviv (IL)

( * ) Notice: Subject to any disclaimer, the term of this patent is extended or adjusted under 35 U.S.C. 154(b) by 338 days.

(21) Appl. No.: 14/726,919

(22) Filed: Jun. 1, 2015

(65) Prior Publication Data
US 2016/0034419 A1  Feb. 4, 2016

Related U.S. Application Data

(60) Provisional application No. 62/126,920, filed on Mar. 2, 2015, provisional application No. 62/119,412, filed
(Continued)

(51) Int. Cl.
G06F 15/16 (2006.01)
G06F 3/06 (2006.01)
G06F 15/167 (2006.01)
H04L 29/08 (2006.01)
G06F 15/173 (2006.01)
G06F 12/1081 (2016.01)
H04L 12/06 (2006.01)
H04L 12/64 (2006.01)

(52) U.S. Cl.
CPC .......... G06F 3/0611 (2013.01); G06F 3/0604 (2013.01); G06F 3/064 (2013.01); G06F 3/065 (2013.01); G06F 3/067 (2013.01); G06F 3/0637 (2013.01); G06F 3/0647 (2013.01); G06F 3/0652 (2013.01); G06F 3/0659 (2013.01); G06F 3/0688 (2013.01); G06F 3/0689 (2013.01); G06F 12/1081 (2013.01); G06F 15/167 (2013.01); G06F 15/17331 (2013.01); H04L 12/06 (2013.01); H04L 12/6418 (2013.01); H04L 67/1097 (2013.01); G06F 2212/65 (2013.01)

(58) Field of Classification Search
CPC .. G06F 15/17331; G06F 3/0637; G06F 3/067; G06F 3/0611
USPC ......................................... 709/203, 217, 200
See application file for complete search history.

(56) References Cited

U.S. PATENT DOCUMENTS 5,717,691 A    2/1998  Dighe et al.
6,839,803 B1   1/2005  Loh et al.
(Continued)

Primary Examiner — El Hadji Sall
(74) Attorney, Agent, or Firm — M&B IP Analysts, LLC

(57) ABSTRACT

A network interface controller (NIC) for use in a server controlling a plurality of storage devices provides remote access to a plurality of clients each accessing one or more storage devices of the plurality of storage devices. The NIC is configured to receive from at least a client device an input/output (I/O) request for a storage device of the plurality of storage devices and store the I/O request in a secondary memory thereof. The I/O request is sent to the storage device and a response respective of the I/O request intended for the primary processing unit of the server is received by the NIC. The client device is sent an indication that the I/O request is completed. In some exemplary embodiments, the NIC determines if the client device has appropriate I/O permissions to access a specific data block.

29 Claims, 4 Drawing Sheets

Related U.S. Application Data on Feb. 23, 2015, provisional application No. 62/096,908, filed on Dec. 26, 2014, provisional application No. 62/085,568, filed on Nov. 30, 2014, provisional application No. 62/030,700, filed on Jul. 30, 2014.

(56) References Cited

U.S. PATENT DOCUMENTS

| | | |
|---|---|---|
| 7,515,612 B1 | 4/2009 | Thompson |
| 7,539,780 B2 | 5/2009 | Makhervaks et al. |
| 7,577,667 B2 | 8/2009 | Hinshaw et al. |
| 7,590,768 B2 | 9/2009 | Gormley |
| 7,710,968 B2 | 5/2010 | Cornett et al. |
| 8,037,154 B2 | 10/2011 | Biran et al. |
| 8,103,785 B2 | 1/2012 | Crowley et al. |
| 8,122,155 B1 | 2/2012 | Marti |
| 8,233,380 B2 | 7/2012 | Subramanian et al. |
| 8,433,848 B1 | 4/2013 | Naamad et al. |
| 8,706,962 B2 | 4/2014 | Belluomini et al. |
| 8,775,718 B2 | 7/2014 | Kanevsky et al. |
| 8,832,216 B2 | 9/2014 | Bugge |
| 2005/0129039 A1 | 6/2005 | Biran et al. |
| 2012/0144233 A1* | 6/2012 | Griffith ............... G06F 11/1443 714/13 |
| 2013/0198311 A1 | 8/2013 | Tamir et al. |
| 2013/0198312 A1 | 8/2013 | Tamir et al. |
| 2014/0089444 A1 | 3/2014 | Makhervaks et al. |
| 2014/0297982 A1 | 10/2014 | Duzett |
| 2015/0026286 A1 | 1/2015 | Sharp et al. |
| 2015/0089121 A1* | 3/2015 | Coudhury ........... G06F 12/0246 711/103 |

* cited by examiner

SYSTEM AND METHOD FOR EFFICIENT ACCESS FOR REMOTE STORAGE DEVICES

CROSS-REFERENCE TO RELATED APPLICATIONS

This Application claims priority to U.S. provisional Application Nos. 62/126,920 filed on Mar. 2, 2015, 62/119,412 filed on Feb. 23, 2015, 62/096,908 filed on Dec. 26, 2014, 62/085,568 filed on Nov. 30, 2014, and 62/030,700 filed on Jul. 30, 2014, the entire disclosures of which are incorporated herein by reference for all purposes.

BACKGROUND OF THE INVENTION

Field

The disclosure generally relates to accessing remote storage devices and particularly to accessing remote storage devices over remote access.

Description of Related Art

Storage systems are growing in complexity for various reasons including having to control an ever growing amount of storage devices, and having to retrieve and store large quantities of data, just to name a few. There are various advantages to providing access to remote storage devices controlled by one or more servers to a plurality of client devices, while reducing Central Processing Unit (CPU) intervention in these processes. Remote direct memory access (RDMA) provides direct memory access from the memory of one computer device into another computer device without requiring operation system intervention. However, this provides various challenges, such as handling a plurality of requests from a plurality of clients to permit high-throughput, low-latency networking.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Similarly, issues identified with respect to one or more approaches should not assume to have been recognized in any prior art on the basis of this section, unless otherwise indicated.

SUMMARY OF THE INVENTION

Exemplary embodiments overcome the above disadvantages and other disadvantages not described above. Also, an exemplary embodiment is not required to overcome the disadvantages described above, and an exemplary embodiment of the present inventive concept may not overcome any of the problems described above.

One or more exemplary embodiments provide a network interface controller (NIC) for use in a server controlling a plurality of storage devices, the NIC including: a network interface configured to communicatively connect the NIC to a network including a client device and the server; a communication interface configured to communicatively connect the NIC to a primary processing unit of the server; a secondary processing unit; a first memory containing instructions for execution by the secondary processing unit; and a second memory; wherein the instructions, when executed by the secondary processing unit, configure the NIC to: receive, from the client device, an input/output (I/O) request for a storage device from among the plurality of storage devices; store the I/O request in the second memory; send the I/O request to the storage device; receive, from the storage device, a response respective of the I/O request intended for the primary processing unit; and send the client device an indication that the I/O request is completed.

The second memory may include a queue configured to store a plurality of received I/O requests.

The first memory may further contain instructions that when executed by the secondary processing unit configure the NIC to: send again an I/O request stored in the second memory, in response to determining that the I/O request was not executed by the storage device.

The first memory may further contain instructions that when executed by the secondary processing unit configure the NIC to: erase the I/O request from the secondary memory in response to determining that the received response indicates a successful completion of the I/O request.

The secondary processing unit, the first memory and the second memory may be implemented from one of: a field-programmable gate array (FPGA), a complex programmable logic device (CPLD), an application-specific integrated circuit (ASIC), and a system on a chip (SoC).

The first memory and the second memory may be implemented as a single logic circuit.

The received response respective of the I/O request may include an interrupt request.

The indication sent to the client device may include an interrupt request.

The NIC may be further configured to send the indication to the client device before receiving an interrupt message respective of the I/O request from the storage device.

The I/O request may include a block of data and an address respective of the storage device.

The network interface and the communication interface may be implemented as a single interface.

The I/O request may contain an address of a data block respective of the storage device, and the first memory further contains instructions that when executed by the secondary processing unit configure the NIC to: determine if the client device has permission to access the data block of the storage device.

The NIC may provide support for remote direct memory access (RDMA) protocol, and the I/O request is stored in an I/O queue of the second memory using RDMA protocol.

The NIC may provide support for remote direct memory access (RDMA) protocol and the response respective of the I/O request is stored directly in a memory of the client device.

The first memory may further contain instructions that when executed by the secondary processing unit configure the NIC to: send the client device an indication that the received I/O request was not completed, in response to determining that the client device does not have permission to access the data block of the storage device.

The first memory further contains instructions that when executed by the secondary processing unit configure the NIC to: access a table of permissions to determine if the client device has permission to access the data block of the storage device, the table containing a list of data blocks of the storage device, and for each client device accessing the storage device, per instruction type permissions per each data block.

According to an aspect of an exemplary embodiment, there is provided a computerized method for providing a client device remote access to a server controlling a plurality of storage devices, by a network interface controller (NIC) including a secondary processing unit, a first memory and a second memory, the method including: receiving from the client device an input/output (I/O) request for a storage device from among the plurality of storage devices; storing the I/O request in the secondary memory of the NIC; sending the I/O request from the NIC to the storage device; receiving, from the storage device, a response respective of the I/O request intended for a primary processing unit of the server; and sending, from the NIC to the client device, an indication that the I/O request is completed.

The computerized method may further include storing a plurality of received I/O requests, using a queue of the secondary memory.

The computerized method may further include in response to determining that the I/O request was not executed by the storage device, sending an I/O request stored in the second memory again.

The computerized method may further include in response to determining that the received response indicates a successful completion of the I/O request, erasing the I/O request from the secondary memory.

The secondary processing unit, the first memory and the second memory may be implemented from one of: a field-programmable gate array (FPGA), a complex programmable logic device (CPLD), an application-specific integrated circuit (ASIC), and a system on a chip (SoC).

The first memory and the second memory may be implemented as a single logic circuit.

The received response respective of the I/O request includes an interrupt request.

The indication sent to the client device includes an interrupt request.

The computerized method may further include sending the indication to the client device before receiving the response respective of the I/O request from the storage device.

The I/O request may include a block of data and an address respective of the storage device.

The I/O request may contain an address of a data block respective of the storage device, the method further including: determining if the client device has permission to access the data block of the storage device.

The NIC may provide support for remote direct memory access (RDMA) protocol, and the I/O requests are stored in a queue of the second memory using RDMA protocol.

The NIC may provide support for remote direct memory access (RDMA) protocol and the I/O response is stored directly in a memory of the client device.

The computerized method may further include in response to determining that the client device does not have permission to access the data block of the storage device, sending an indication that the received I/O request was not completed to the client device.

The determining if the client device has permission to access the data block of the storage device may further include: accessing a table of permissions containing a list of data blocks of the storage device, and for each client device accessing the storage device, per instruction type permissions per each data block.

The instruction type may be any of: read, write, and discard.

According to an aspect of another exemplary embodiment, there is provided a non-transitory computer readable medium having stored thereon instructions for causing one or more processing units to execute a method for providing a client device remote access to a server controlling a plurality of storage devices, by a network interface controller (NIC) including a secondary processing unit, a first memory and a second memory, the method including: receiving from the client device an input/output (I/O) request for a storage device from among the plurality of storage devices; storing the I/O request in the secondary memory of the NIC; sending the I/O request from the NIC to the storage device; receiving, from the storage device, a response respective of the I/O request intended for a primary processing unit of the server; and sending, from the NIC to the client device, an indication that the I/O request is completed.

Other features and aspects will be apparent from the following detailed description, the drawings, and the claims.

BRIEF DESCRIPTION OF THE DRAWINGS

The foregoing and other objects, features and advantages will become apparent and more readily appreciated from the following detailed description taken in conjunction with the accompanying drawings, in which.

DETAILED DESCRIPTION OF THE INVENTION

Figure 1A:
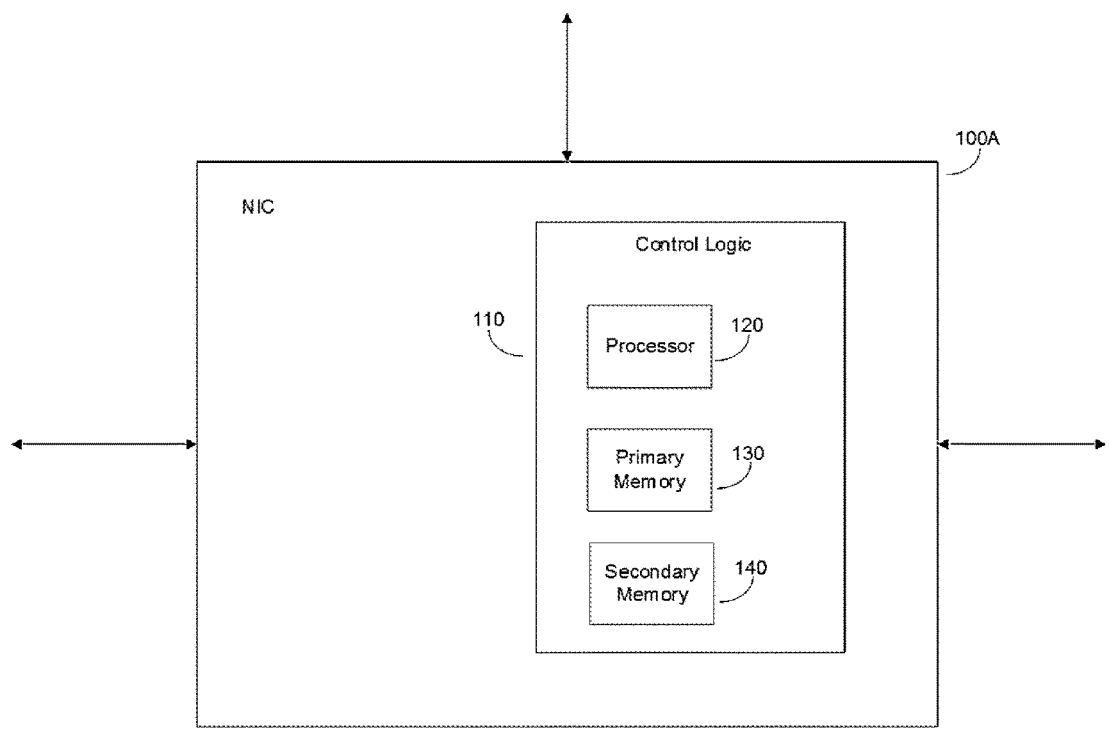
FIG. 1A—is a schematic illustration of a network interface controller (NIC) for operation in a server controlling a plurality of remote storage devices implemented according to an exemplary embodiment.

Below, exemplary embodiments will be described in detail with reference to accompanying drawings so as to be easily realized by a person having ordinary knowledge in the art. The exemplary embodiments may be embodied in various forms without being limited to the exemplary embodiments set forth herein. Descriptions of well-known parts are omitted for clarity, and like reference numerals refer to like elements throughout.

It is important to note that the exemplary embodiments disclosed herein are only examples of the many advantageous uses of the innovative teachings herein. In general, statements made in the specification of the present application do not necessarily limit any of the various claims. Moreover, some statements may apply to some inventive features but not others. In general, unless otherwise indicated, singular elements may be in plural and vice versa with no loss of generality.

A network interface controller (NIC) for use in a server controlling a plurality of storage devices provides access to a plurality of clients each accessing one or more storage devices of the plurality of storage devices. The NIC is configured to receive from at least a client device an input/output (I/O) request for a storage device of the plurality of storage devices and store the I/O request in a secondary memory thereof. The I/O request is sent to the storage device and a response respective of the I/O request intended for the primary processing unit of the server is received by the NIC. The client device is sent an indication that the I/O request is completed. In some exemplary embodiments, the NIC determines if the client device has appropriate I/O permissions to access a specific data block.

FIG. 1A is an exemplary and non-limiting schematic illustration of a network interface controller (NIC) 100A for operation in a server controlling a plurality of remote storage devices, implemented according to an exemplary embodiment. The NIC 100A includes a control logic 110, which further includes at least one processor 120, a primary memory 130, and a secondary memory 140. Primary memory 130 includes instructions that when executed by the processor 120 performs a method described in more detail herein. Secondary memory 140 includes a memory queue for storing input/output (I/O) requests received from at least a client device (not shown). The NIC 100A is further configured to provide connectivity between a computer server to a network. See, e.g. FIG. 3. The NIC 100A is further configured to provide remote direct access for a client device to remotely access a storage portion on a storage device connected to the computer server. See, e.g., FIG. 3. Control logic 110 may be implemented, for example, as a field-programmable gate array (FPGA), a complex programmable logic device (CPLD), an application-specific integrated circuit (ASIC), a system on a chip (SoC), etc.

Figure 1B:
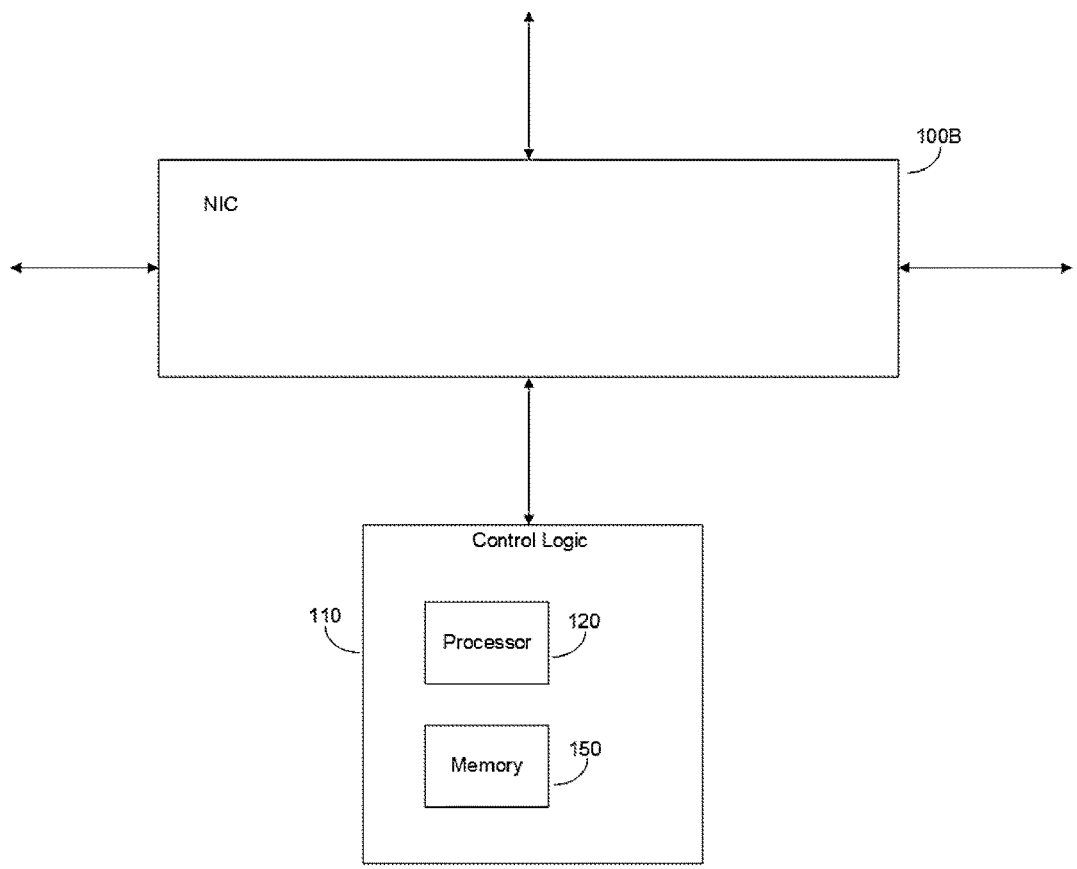
FIG. 1B—is a schematic illustration of a network interface controller (NIC) for operation in a server controlling a plurality of remote storage devices implemented according to another exemplary embodiment.

FIG. 1B is an exemplary and non-limiting schematic illustration of a network interface controller (NIC) 100B for operation in a server controlling a plurality of remote storage devices, implemented according to another exemplary embodiment. The NIC 100B is communicatively connected to a control logic 110. The control logic 110 includes at least one processor 120, and a memory 150. The memory 150 includes a primary memory portion and a secondary memory portion (neither shown). The primary memory portion includes instructions that when executed by the processor 120 performs a method described in more detail herein. The secondary portion of the memory 150 includes a memory queue for storing input/output (I/O) requests received from at least a client device. Of course the control logic 110 that is external to the NIC 100B as shown in FIG. 1B can include the primary memory 130 and the secondary memory 140 described above with respect to FIG. 1A. Similarly, the control logic 110 that is internal to the NIC 100A as shown in FIG. 1A can include the memory 150 described above with respect to FIG. 1B.

Referring back to FIG. 1B, the NIC 100B is further configured to provide connectivity between a computer server to a network (neither shown). See, e.g., FIG. 3. The NIC 100B is further configured to provide remote direct access for a client device to remotely access a storage portion on a storage device connected the controller server (not shown). See, e.g., FIG. 3. Control logic 110 may be implemented, for example, as a field-programmable gate array (FPGA), a complex programmable logic device (CPLD), an application-specific integrated circuit (ASIC), a system on a chip (SoC), etc.

The connectivity between the computer server and the network may implement, in some embodiments, remote direct memory access (RDMA) protocols, such as but not limited to RDMA over Converged Ethernet (RoCE), Infiniband, and iWARP. In another exemplary embodiment, the communication may be over a peer-to-peer (P2P) network.

Figure 2:
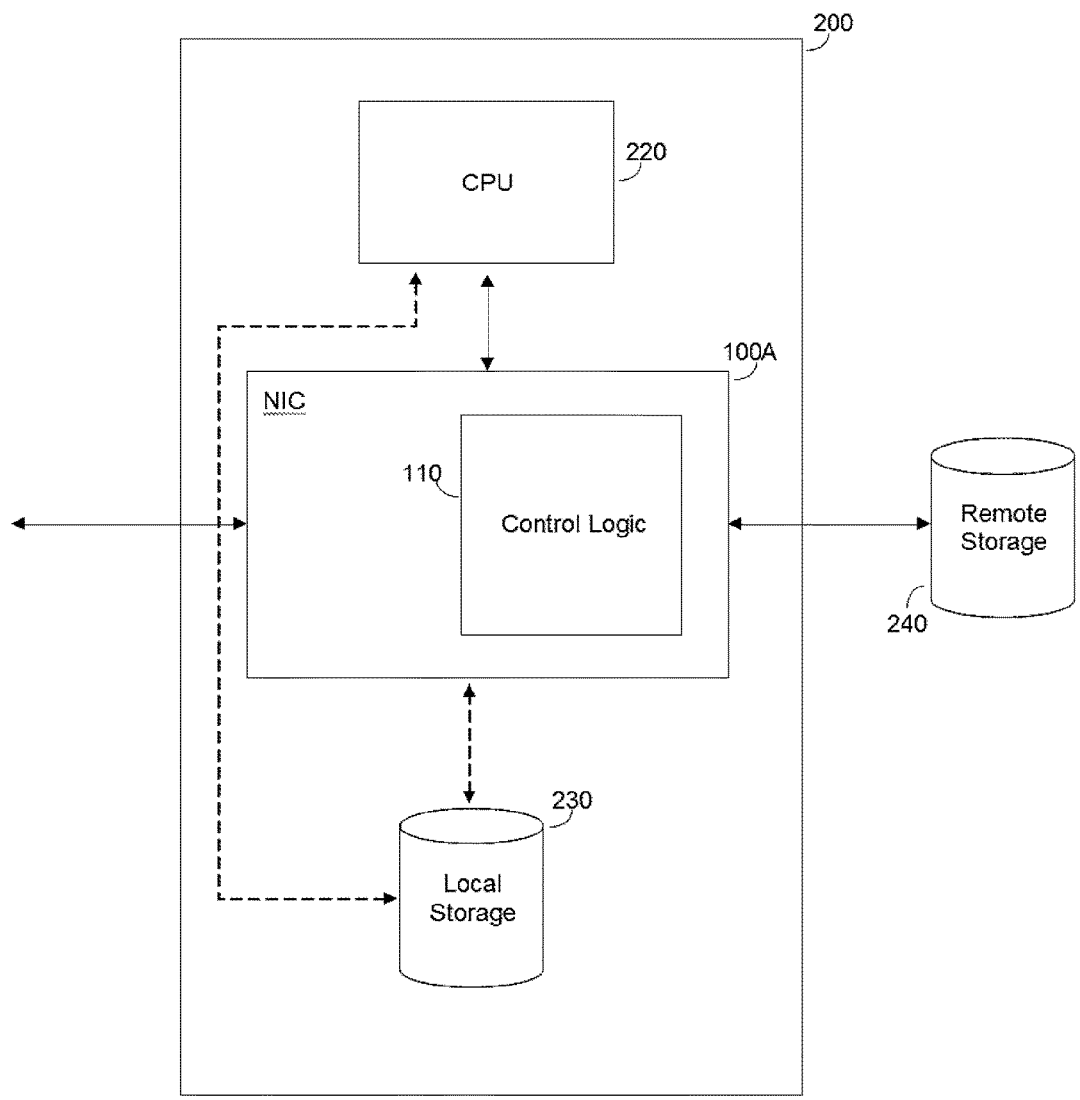
FIG. 2—is a schematic illustration of a controller server for controlling a plurality of storage devices implemented according to an exemplary embodiment.

FIG. 2 is an exemplary and non-limiting schematic illustration of a storage server 200 for controlling a plurality of storage devices, implemented according to an exemplary embodiment. Storage server 200 includes a processor, such as central processing unit (CPU) 220, and an NIC 100A. Of course the storage server 200 could include NIC 100B, but for simplicity this exemplary embodiment with be described with reference to NIC 100A. The server 200 may further include one or more local storage devices, such as storage device 230, and/or one or more remote storage devices, such as remote storage device 240. The NIC 100A is configured to receive I/O requests from a plurality of clients, each accessing a portion of storage on a storage device of a plurality of storage devices communicatively connected to the server 200. An I/O request may include a storage device identifier, a storage block, a storage address, and data to be written to the storage device. Upon receiving the I/O request, the NIC 100A may determine if the I/O request should be executed by the CPU 220, or the control logic 110. One advantage of execution of an I/O request by the control logic 110 is offloading from the CPU 220, thereby increasing system efficiency. Upon determination that the I/O request should be executed by the control logic 110, the I/O request may be stored in a memory of the control logic 110. The I/O request is sent to the storage device. The client device from which the I/O request was received is sent a response that may trigger an interrupt to indicate that the I/O request is completed. An interrupt request intended for CPU 220 may be received from a storage device, which may be a local storage device 230, or remote storage device 240. These operations are described in further detail below.

In an exemplary embodiment, the control logic 110 receives an I/O request which includes an address and a block of data to be written to a remote storage device 240. The control logic 110 stores the I/O request in secondary memory 140, and sends an instruction to the remote storage device 240 to write the block of data to the address. The control logic 110 sends the client device a response that may trigger an interrupt indicating that the I/O request was completed. In response to the block of data not being successfully written to the remote storage device 240, the remote storage device outputs an interrupt indicating that the block of data was not successfully written to the remote storage device 240. The control logic 110 receives this interrupt from the remote storage device 240. In response to receiving this interrupt from the remote storage device 240, the control logic 110 may then resend an instruction to write any portion of the block of data which was not successfully written to the storage device 240, or resend the entire block of data to be written, for example. In response to the block of data being successfully written, the remote storage device 240 outputs a message that may trigger an interrupt indicating an I/O request was completed successfully. The control logic 110, in response to receiving the interrupt indicating the I/O request was successfully completed, may then erase the completed I/O request from secondary memory 140.

In some exemplary embodiments, a control logic, such as control logic 110 receives a plurality of I/O requests and stores them in a memory queue communicatively connected to the control logic. The stored I/O requests may be handled by the control logic according to a timestamp, or an assigned priority, for example.

In certain exemplary embodiments, a control logic, such as control logic 110 receives an I/O request from a client device. The I/O request includes an address of a block of data and may be a 'read', 'write', 'discard' or other storage instruction. The control logic determines if the client device has the appropriate access permission for the block of data and the instruction. If the client device does not have the appropriate permission, the control logic 110 sends an indication to the client device that the I/O request was not completed. A client device may have a 'read' permission for a block of data for which it does not have 'write' permission, for example. If the control logic determines that the client device has the appropriate 'read' or 'write' permission, execution continues as detailed further herein. Determination of permissions may be performed, for example, by accessing a table containing a list of data blocks and client devices having access permissions for each data block in the list. A table, list, database, bitmap, and like data structures may be used to determine I/O permissions. The data structure may be stored on the control logic 110, on the NIC 100A (or 100B), or separately of both but accessible to the control logic 110.

Figure 3:
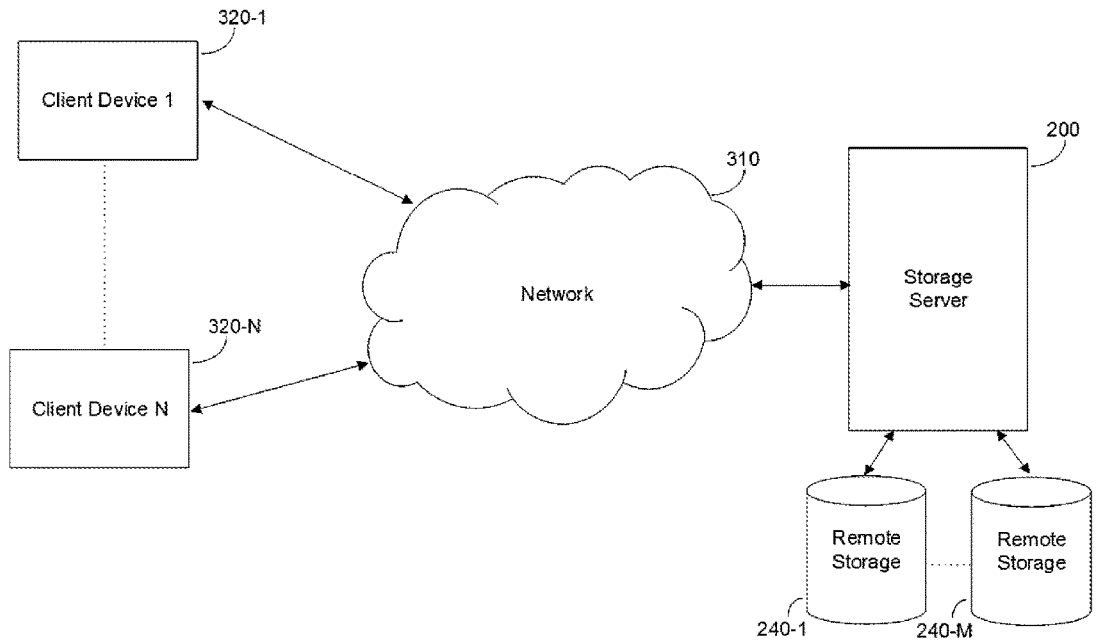
FIG. 3—is a schematic illustration of a storage server with an NIC implemented within a network in accordance with an exemplary embodiment.

FIG. 3 is a non-limiting exemplary schematic illustration of the storage server 200 described with respect to FIG. 2 connected with client devices 320-1 to 320-N over a network 310. Storage server 200 is communicatively coupled with network 310. The network 310 is configured to provide connectivity of various sorts, as may be necessary, including but not limited to, wired and/or wireless connectivity, including, for example, local area network (LAN), wide area network (WAN), metro area network (MAN), World Wide Web (WWW), Internet, and any combination thereof, as well as cellular connectivity. Network 310 is further communicatively coupled with client devices 320, such as client devices 320-1 through 320-N. Each client device 320 may access a remote storage device 240, or portions thereof, of a plurality of storage devices 240, such as storage devices 240-1 through 240-M.

Figure 4:
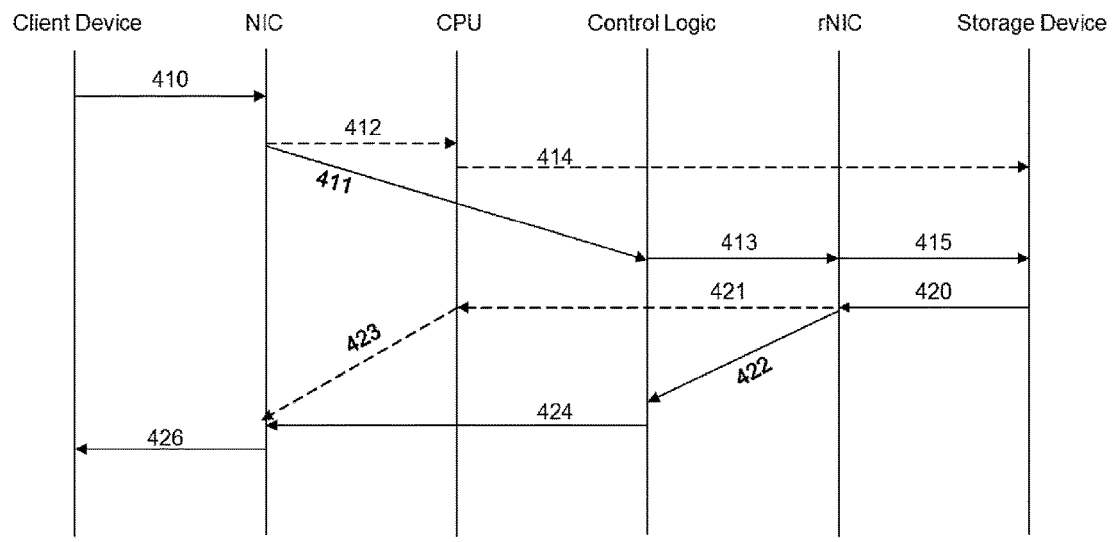
FIG. 4—is a network diagram of a client device accessing a remote storage device of a storage server coupled to an NIC according to an exemplary embodiment.

FIG. 4 is a non-limiting exemplary network diagram of a client device 320 accessing a remote storage device 240 of a storage server 200 coupled to an NIC, according to an exemplary embodiment. A client device sends (410) an I/O request to a storage server, the storage server is communicatively coupled to an NIC and at least a remote storage device. The I/O request is respective of the at least a remote storage device, and may include, for example, a request to write a block of data to an address of the remote storage device. The request is received by the NIC of the storage server. The NIC may determine if the I/O request should be handled by a control logic (411) communicatively connected to the NIC or by a processing element of the storage server (412), such as a CPU. Using a control logic to handle I/O requests to the storage device frees the CPU for other processes and accelerates the process of writing to a disk. Having a memory queue of I/O requests allows the control logic to handle a plurality of I/O requests from a plurality of client devices and further allows each client device to treat the I/O request as completed upon receiving an indication of completion from the control logic, for example as an interrupt, or as an entry in a completion queue. The control logic sends the I/O request (413) to the storage device through the NIC (415). The CPU may send (414) an I/O request directly to the storage device, if the storage device is a local storage device communicatively connected to the CPU, or the CPU may send the I/O request through the NIC. The storage device sends (420) an interrupt, which is received by the NIC. The NIC may determine if the interrupt should be handled by the CPU (421) or by the control logic (422). The CPU may send (423) a response message indicating completion which, according to an embodiment, may trigger an interrupt to the client device through the NIC (426) to indicate that the I/O request was completed. The control logic sends (424) a response message indicating completion which, according to an embodiment, may trigger an interrupt through the NIC (426) to the client device to indicate that the I/O request was completed. Using the control logic with a memory including a plurality of I/O requests allows a response messages which each may trigger an interrupt indicating completion of the I/O request to be sent to the client device before such an interrupt message is received from the storage device. As a result, the I/O process is accelerated, since the client receives the indication before the operation is actually complete in its entirety by the storage device. The storage device remains consistent since the I/O request is stored in the memory of the control logic, which verifies that the I/O request is performed by the storage by receiving the completion indications and resending I/O requests as necessary until the operation is complete. On the client device side, this operation is transparent, e.g., the operation does not affect the client device's operation or require additional input.

The principles herein are implemented as hardware, firmware, software or any combination thereof. Moreover, the software is preferably implemented as an application program tangibly embodied on a program storage unit or computer readable medium. The application program may be uploaded to, and executed by, a machine comprising any suitable architecture. Preferably, the machine is implemented on a computer platform having hardware such as a processing unit ("CPU"), a memory, and input/output interfaces. The computer platform may also include an operating system and microinstruction code. The various processes and functions described herein may be either part of the microinstruction code or part of the application program, or any combination thereof, which may be executed by a CPU, whether or not such computer or processor is explicitly shown. In addition, various other peripheral units may be connected to the computer platform such as an additional data storage unit and a printing unit and/or display unit.

All examples and conditional language recited herein are intended for pedagogical purposes to aid the reader in understanding the principles of the disclosure and the concepts contributed by the inventor to furthering the art, and are to be construed as being without limitation to such specifically recited examples and conditions.

Moreover, all statements herein reciting principles, aspects, and exemplary embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. A network interface controller (NIC) for use in a server controlling a plurality of storage devices, the NIC comprising:
   a network interface configured to communicatively connect the NIC to a network comprising a client device and the server;
   a communication interface configured to communicatively connect the NIC to a primary processing unit of the server;
   a secondary processing unit;
   a first memory containing instructions for execution by the secondary processing unit; and
   a second memory;
   wherein the instructions, when executed by the secondary processing unit, configure the NIC to:
   receive, from the client device, an input/output (I/O) request for a storage device from among the plurality of storage devices;
   store the I/O request in the second memory;

send the I/O request to the storage device;
receive, from the storage device, a response for the I/O request intended for the primary processing unit; and
send the client device an indication that the I/O request is completed;
wherein the I/O request contains an address of a data block for the storage device, and the first memory further contains instructions that when executed by the secondary processing unit configure the NIC to:
access a table of permissions to determine if the client device has permission to access the data block of the storage device, the table containing a list of data blocks of the storage device, and for each client device accessing the storage device, per instruction type permissions per each data block.

2. The NIC of claim 1, wherein the second memory comprises a queue configured to store a plurality of received I/O requests.

3. The NIC of claim 1, wherein the first memory further contains instructions that when executed by the secondary processing unit configure the NIC to:
send again an I/O request stored in the second memory, in response to determining that the I/O request was not executed by the storage device.

4. The NIC of claim 1, wherein the first memory further contains instructions that when executed by the secondary processing unit configure the NIC to:
erase the I/O request from the secondary memory in response to determining that the received response indicates a successful completion of the I/O request.

5. The NIC of claim 1, wherein the secondary processing unit, the first memory and the second memory are implemented from one of: a field-programmable gate array (FPGA), a complex programmable logic device (CPLD), an application-specific integrated circuit (ASIC), and a system on a chip (SoC).

6. The NIC of claim 1, wherein the first memory and the second memory are implemented as a single logic circuit.

7. The NIC of claim 1, wherein the received response for the I/O request includes an interrupt request.

8. The NIC of claim 1, wherein the indication sent to the client device includes an interrupt request.

9. The NIC of claim 1, wherein the NIC is further configured to send the indication to the client device before receiving an interrupt message for the I/O request from the storage device.

10. The NIC of claim 1, wherein the I/O request comprises a block of data and an address for the storage device.

11. The NIC of claim 1, wherein the network interface and the communication interface are implemented as a single interface.

12. The NIC of claim 2, wherein the NIC provides support for remote direct memory access (RDMA) protocol, and the I/O request is stored in an I/O queue of the second memory using RDMA protocol.

13. The NIC of claim 1, wherein the NIC provides support for remote direct memory access (RDMA) protocol and the response for the I/O request is stored directly in a memory of the client device.

14. The NIC of claim 1, wherein the first memory further contains instructions that when executed by the secondary processing unit configure the NIC to:
send the client device an indication that the received I/O request was not completed, in response to determining that the client device does not have permission to access the data block of the storage device.

15. A computerized method for providing a client device remote access to a server controlling a plurality of storage devices, by a network interface controller (NIC) comprising a secondary processing unit, a first memory and a second memory, the method comprising:
receiving from the client device an input/output (I/O) request for a storage device from among the plurality of storage devices, wherein the I/O request contains an address of a data block for the storage device;
storing the I/O request in the secondary memory of the NIC;
sending the I/O request from the NIC to the storage device;
receiving, from the storage device, a response for the I/O request intended for a primary processing unit of the server;
sending, from the NIC to the client device, an indication that the I/O request is completed; and
accessing a table of permissions to determine if the client device has permission to access the data block of the storage device, the table containing a list of data blocks of the storage device, and for each client device accessing the storage device, per instruction type permissions per each data block.

16. The computerized method of claim 15, storing a plurality of received I/O requests, using a queue of the secondary memory.

17. The computerized method of claim 15, further comprising:
in response to determining that the I/O request was not executed by the storage device, sending an I/O request stored in the second memory again.

18. The computerized method of claim 15, further comprising: in response to determining that the received response indicates a successful completion of the I/O request, erasing the I/O request from the secondary memory.

19. The computerized method of claim 15, wherein the secondary processing unit, the first memory and the second memory are implemented from one of: a field-programmable gate array (FPGA), a complex programmable logic device (CPLD), an application-specific integrated circuit (ASIC), and a system on a chip (SoC).

20. The computerized method of claim 15, wherein the first memory and the second memory are implemented as a single logic circuit.

21. The computerized method of claim 15, wherein the received response for the I/O request includes an interrupt request.

22. The computerized method of claim 15, wherein the indication sent to the client device includes an interrupt request.

23. The computerized method of claim 15, further comprising sending the indication to the client device before receiving the response for the I/O request from the storage device.

24. The computerized method of claim 15, wherein the I/O request comprises a block of data and an address for the storage device.

25. The computerized method of claim 16 wherein the NIC provides support for remote direct memory access (RDMA) protocol, and the I/O requests are stored in a queue of the second memory using RDMA protocol.

26. The computerized method of claim 15, wherein the NIC provides support for remote direct memory access (RDMA) protocol and the I/O response is stored directly in a memory of the client device.

27. The computerized method of claim 15, further comprising:

in response to determining that the client device does not have permission to access the data block of the storage device, sending an indication that the received I/O request was not completed to the client device.

28. The computerized method of claim 15, wherein the instruction type is any of: read, write, and discard.

29. A non-transitory computer readable medium having stored thereon instructions for causing one or more processing units to execute a method for providing a client device remote access to a server controlling a plurality of storage devices, by a network interface controller (NIC) comprising a secondary processing unit, a first memory and a second memory, the method comprising:

receiving from the client device an input/output (I/O) request for a storage device from among the plurality of storage devices, wherein the I/O request contains an address of a data block for the storage device;

storing the I/O request in the secondary memory of the NIC;

sending the I/O request from the NIC to the storage device;

receiving, from the storage device, a response for the I/O request intended for a primary processing unit of the server; and sending, from the NIC to the client device, an indication that the I/O request is completed; and accessing a table of permissions to determine if the client device has permission to access the data block of the storage device, the table containing a list of data blocks of the storage device, and for each client device accessing the storage device, per instruction type permissions per each data block.

* * * * *